(12) United States Patent
Chen (10) Patent No.: US 12,379,540 B1
(45) Date of Patent: Aug. 5, 2025

(54) BACKLIGHT MODULE OF ILLUMINATED KEYBOARD

(71) Applicant: CHICONY POWER TECHNOLOGY CO., LTD., New Taipei (TW)

(72) Inventor: Tsung-Hsun Chen, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 18/936,181

(22) Filed: Nov. 4, 2024

(30) Foreign Application Priority Data

Jul. 29, 2024 (TW) ................. 113128092

(51) Int. Cl.
*F21V 8/00* (2006.01)
*H01H 13/83* (2006.01)

(52) U.S. Cl.
CPC ......... *G02B 6/0083* (2013.01); *G02B 6/0068* (2013.01); *G02B 6/0073* (2013.01); *G02B 6/0091* (2013.01); *H01H 13/83* (2013.01)

(58) Field of Classification Search
CPC .. G02B 6/0083; G02B 6/0068; G02B 6/0073; G02B 6/0091; H01H 13/83
See application file for complete search history.

(56) References Cited

U.S. PATENT DOCUMENTS

2022/0044889 A1   2/2022   Ho et al.

FOREIGN PATENT DOCUMENTS

| CN | 103354188 A | 10/2013 |
|---|---|---|
| CN | 204291617 U | 4/2015 |
| CN | 205670514 U | 11/2016 |
| CN | 216118080 U | 3/2022 |
| CN | 219145664 U | 6/2023 |
| TW | 201324244 A | 6/2013 |
| TW | 202011439 A | 3/2020 |
| TW | M603188 U | 10/2020 |
| TW | 202206980 A | 2/2022 |
| TW | 202217888 A | 5/2022 |
| TW | I777806 B | 9/2022 |
| TW | 202341206 A | 10/2023 |
| TW | I817684 B | 10/2023 |
| TW | M663741 U | 12/2024 |

OTHER PUBLICATIONS

Li et al., CN 220965216, May 2024 (Year: 2024).*
Office Action dated Mar. 27, 2025 of the corresponding Taiwan patent application No. 113128092.

* cited by examiner

*Primary Examiner* — Mary Ellen Bowman
(74) *Attorney, Agent, or Firm* — MUNCY, GEISSLER, OLDS & LOWE, P.C.

(57) ABSTRACT

A backlight module of an illuminated keyboard includes: a circuit board including a first circuit, a second circuit, a gathering portion and a conduction portion, and the first circuit having a first line section; a light guiding plate disposed on the circuit board, including a first light guiding region and a second light guiding region, and the first light guiding region disposed on the first line section; a plurality of light-emitting elements disposed in parallel on the first line section; and an resistor unit including a first resistor and a second resistor, the first resistor disposed on the first circuit, and the second resistor disposed on the second circuit. A sum of a line impedance of the first circuit and an impedance of the first resistor is substantially equal to a sum of a line impedance of the second circuit and an impedance of the second resistor.

20 Claims, 9 Drawing Sheets

BACKLIGHT MODULE OF ILLUMINATED KEYBOARD

BACKGROUND OF THE DISCLOSURE

Technical Field

The present disclosure relates to a backlight module, and particularly relates to a backlight module of an illuminated keyboard.

Description of Related Art

The backlight module of the currently popular illuminated keyboard includes four major components, which are disposed under the keyboard and include a light shielding plate, a light guide plate (LGP), a reflective plate, and a light bar in order. This type of backlight module is structured as all the light-emitting elements being placed on the same light bar, and the light bar is placed near the center of the backlight module. Thus, the light emitted from the light-emitting elements on the light bar enters the light guide plate from two sides of the light guide plate, and then is distributed on the backside of the keyboard by the light guide plate, thereby forming the backlight of keyboard.

However, the above-mentioned illuminated keyboard has the disadvantages that the keyboard is thick and the light uniformity is bad. Accordingly, another light-emitting module of the illuminated keyboard is introduced to solve these problems. In this case, the light-emitting elements are installed on the circuit board, and a plurality of components are stacked to form the keyboard. The stacked components include the keycaps, scissor switches, metal plate, black matrix (BM), light guide plate, reflective plate, and circuit board. Since the minimum thickness of the general LED of the light-emitting component is about 0.15 mm, the proper design needs to be considered for decreasing the entire thickness and increasing the luminance and light uniformity.

In addition, the current illuminated keyboard is structured with resistors to control the luminance of the overall backlight module. In general, if there are N light-emitting elements, N resistors are provided to respectively control the luminance of the light-emitting elements so as to control the overall luminance. However, when the number of light-emitting elements is large, the cost of the required components also increases, thereby losing the cost advantage of the products.

Therefore, it is desired to provide a novel illuminated keyboard design that may improve the luminance of keyboard and provide a uniform light distribution.

SUMMARY OF THE DISCLOSURE

The disclosure provides a backlight module of an illuminated keyboard, which may improve the luminance and make the optical coupling more uniform.

The disclosure provides a backlight module of an illuminated keyboard, the backlight module including: a circuit board, including a first circuit, a second circuit, a gathering portion and a conduction portion, the first circuit and the second circuit electrically connected to the gathering portion, the gathering portion electrically connected to the conduction portion, the first circuit comprising a first line section, and the second circuit comprising a second line section; a light guiding plate, disposed on the circuit board, including a first light guiding region and a second light guiding region, the first light guiding region disposed on the first line section, and the second light guiding region disposed on the second line section; a plurality of light emitting elements, disposed in parallel on the first line section and disposed in parallel on the second line section; and a resistor unit, including a first resistor and a second resistor, the first resistor disposed on the first circuit, and the second resistor disposed on the second circuit, wherein a sum of a line impedance of the first circuit and an impedance of the first resistor is substantially equal to a sum of a line impedance of the second circuit and an impedance of the second resistor.

In some embodiments, the first light guiding region includes a first sub-region and a second sub-region disposed adjacently, the first sub-region includes a first single key light guiding region and a second single key light guiding region disposed on two sides thereof, and one of the light emitting elements is disposed on one side of the first single key light guiding region and emits a light toward the first single key light guiding region and the second single key light guiding region.

In some embodiments, the first sub-region includes a light transmitting channel passing through the first single key light guiding region and the second single key light guiding region.

In some embodiments, the first sub-region is disposed adjacent to a side of the light guiding plate, a distance between the first single key light guiding region and the side is greater than a distance between the second single key light guiding region and the side, and a microstructure density of the first single key light guiding region is less than a microstructure density of the second single key light guiding region.

In some embodiments, the light guiding plate includes a third light guiding region, the third light guiding region includes a third single key light guiding region, an area of the third single key light guiding region is greater than an area of the first single key light guiding region or an area of the second single key light guiding region, and the gathering portion is disposed on the circuit board in a region vertically corresponding to the third light guiding region.

In some embodiments, an amount of the light emitting elements on the first line section is equal to an amount of the light emitting elements on the second line section, a line length of a center position of the light emitting elements on the first circuit to the gathering portion is greater than a line length of a center position of the light emitting elements on the second circuit to the gathering portion, and the impedance of the first resistor is less than the impedance of the second resistor.

In some embodiments, the first light guiding region includes a plurality of single key light guiding regions, the second light guiding region includes a plurality of single key light guiding regions, a first ratio of a microstructure area sum of the single key light guiding regions of the first light guiding region divided by an amount of the light emitting elements on the first line section is greater than a second ratio of a microstructure area sum of the single key light guiding regions of the second light guiding region divided by an amount of the light emitting elements on the second line section, and the impedance of the first resistor is greater than the impedance of the second resistor.

In some embodiments, an amount of the light emitting elements on the first line section is less than an amount of the light emitting elements on the second line section, a line length of a center position of the light emitting elements on the first circuit to the gathering portion is about equal to a line length of a center position of the light emitting elements on the second circuit to the gathering portion, and the impedance of the first resistor is greater than the impedance of the second resistor.

In some embodiments, an amount of the light emitting elements on the first line section is equal to an amount of the light emitting elements on the second line section, the first light guiding region comprises a plurality of single key light guiding regions, the second light guiding region comprises a plurality of single key light guiding regions, a microstructure area sum of the single key light guiding regions in the first light guiding region is greater than a microstructure area sum of the single key light guiding regions in the second light guiding region, and the impedance of the first resistor is greater than the impedance of the second resistor.

In some embodiments, the first resistor and the second resistor are electrically connected with the gathering portion.

In some embodiments, the conduction portion is disposed adjacent to a long side of the circuit board, and the gathering portion is disposed adjacent to the conduction portion.

The disclosure provides the other backlight module of an illuminated keyboard, the backlight module including: a circuit board, including a first circuit, a second circuit, a gathering portion and a conduction portion, the first circuit and the second circuit electrically connected to the gathering portion, and the gathering portion electrically connected to the conduction portion; a light guiding plate, disposed on the circuit board, including a first light guiding region and a second light guiding region; a plurality of first light emitting elements, disposed in parallel on the first line section, and located in the first light guiding region; and a plurality of second light emitting elements, disposed in parallel on the second line section, and located in the second light guiding region, wherein a total impedance of the first circuit is substantially equal to a total impedance of the second circuit.

In some embodiments, the first circuit includes a first line section located under the first light guiding region, the second circuit includes a second line section located under the second light guiding region, the first light emitting elements are disposed in parallel on the first line section, and the second light emitting elements are disposed in parallel on the second line section.

In some embodiments, the backlight module further including: a resistor unit, including a first resistor and a second resistor, the first resistor disposed on the first circuit, and the second resistor disposed on the second circuit. A sum of a line impedance of the first circuit and an impedance of the first resistor is substantially equal to a sum of a line impedance of the second circuit and an impedance of the second resistor.

In some embodiments, an amount of the first light emitting elements on the first line section is equal to an amount of the second light emitting elements on the second line section, a line length of a center position of the first light emitting elements on the first circuit to the gathering portion is greater than a line length of a center position of the second light emitting elements on the second circuit to the gathering portion, and the impedance of the first resistor is less than the impedance of the second resistor.

In some embodiments, an amount of the first light emitting elements on the first line section is equal to an amount of the second light emitting elements on the second line section, the first light guiding region comprises a plurality of single key light guiding regions, the second light guiding region comprises a plurality of single key light guiding regions, a microstructure area sum of the single key light guiding regions in the first light guiding region is greater than a microstructure area sum of the single key light guiding regions in the second light guiding region, and the impedance of the first resistor is greater than the impedance of the second resistor.

In some embodiments, an amount of the first light emitting elements on the first line section is less than an amount of the second light emitting elements on the second line section, a line length of a center position of the first light emitting elements on the first circuit to the gathering portion is about equal to a line length of a center position of the second light emitting elements on the second circuit to the gathering portion, and the impedance of the first resistor is greater than the impedance of the second resistor.

In some embodiments, the first light guiding region includes a first sub-region and a second sub-region disposed adjacently, the first sub-region includes a first single key light guiding region and a second single key light guiding region disposed on two sides thereof, and one of the first light emitting elements is disposed on one side of the first single key light guiding region and emits a light toward the first single key light guiding region and the second single key light guiding region.

In some embodiments, the light guiding plate includes a third light guiding region, the third light guiding region includes a third single key light guiding region, an area of the third single key light guiding region is greater than an area of the first single key light guiding region or an area of the second single key light guiding region, and the gathering portion is disposed on the circuit board in a region vertically corresponding to the third light guiding region.

In summary, the backlight module of the illuminated keyboard in the disclosure is dividing the keyboard into a plurality of regions corresponding to the arrangement of the keycaps and dividing the light guiding plate into a plurality of light guiding regions corresponding to the regions, and a plurality of circuits are similarly disposed on the circuit board corresponding to the regions. Different regions have different light emitting areas and different line lengths. The backlight module of the disclosure may have the light emitting elements in different amounts and the light guiding regions with different microstructure areas corresponding to different light emitting areas. Further, the backlight module of the disclosure may have the resistors with different impedances corresponding to different line lengths for making the current of each circuit uniform and stable. In other words, the backlight module of the disclosure may improve the illuminance of the backlight module and make the optical coupling more uniform through adjusting the amounts of the light emitting elements, the microstructure areas of the light guiding regions, and the total impedance of the circuit corresponding to different regions, and further lower the brightness difference between different light guiding regions to a level which human eyes cannot distinguish (for example, the brightness difference is within 50%).

It should be noted that terms such as "first", "second", "third", in the disclosure are employed to describe various elements, components, regions, layers, and/or parts. These terms should not be construed as limitations on the mentioned elements, components, regions, layers, and/or parts. Instead, they are used merely for distinguishing one element, component, region, layer, or part from another. Unless explicitly indicated in the context, the usage of terms such as "first", "second", "third", does not imply any specific sequence or order

DETAILED DESCRIPTION

As used in the present disclosure, terms such as "first", "second", "third", are employed to describe various elements, components, regions, layers, and/or parts. These terms should not be construed as limitations on the mentioned elements, components, regions, layers, and/or parts. Instead, they are used merely for distinguishing one element, component, region, layer, or part from another. Unless explicitly indicated in the context, the usage of terms such as "first", "second", "third", does not imply any specific sequence or order.

The illuminated keyboard generally includes a keyboard assembly, a bottom plate, and a backlight module, here is not intended to be limiting. The keyboard assembly includes, for example, a plurality of keycaps with different sizes, such as function keys, number keys, alphabet keys, input keys, etc. The top of each keycap may be labeled with the symbol notation corresponding to the character or function of the keycap. The symbol notation may be any symbol required by the keyboard function, for example but not limited to, English characters, numbers, special symbols, or symbolic characters of all kinds of input methods, etc. The location of the symbol notation of the keycap may be designed to be translucent, here is not intended to be limiting. As a result, the light generated by the backlight module may emit from the character light emitting region to illuminate the keycap for the user to see and recognize.

The bottom plate is located between the keyboard assembly and the backlight module. The material of the bottom plate is, for example but not limited to, metal such as iron, stainless steel, nickel, copper, etc., or material such as resin, plastic, rubber, etc. The bottom plate may be designed to be transparent or opaque. The bottom plate may have a plurality of openings corresponding to the keycaps. The opening may have a circle shape, rectangular shape, polygonal shape, or the other shapes.

Figure 1:
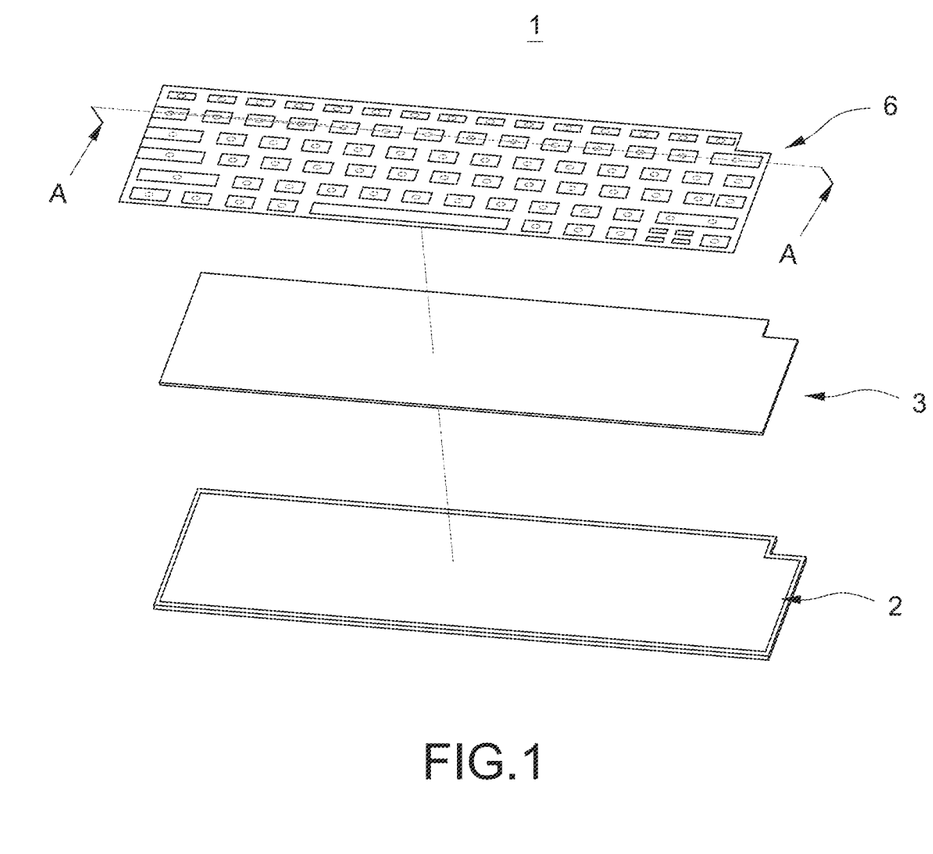
FIG. 1 is the schematic diagram of the backlight module of the illuminated keyboard in disclosure.
Figure 2:
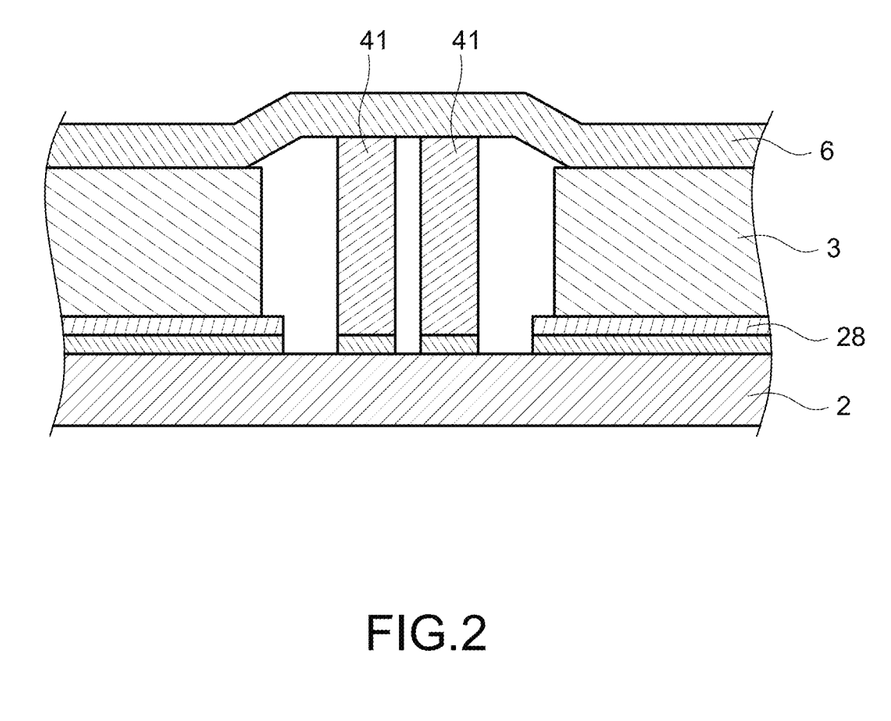
FIG. 2 is the part schematic diagram of the backlight module along line A-A in FIG. 1.
Figure 3:
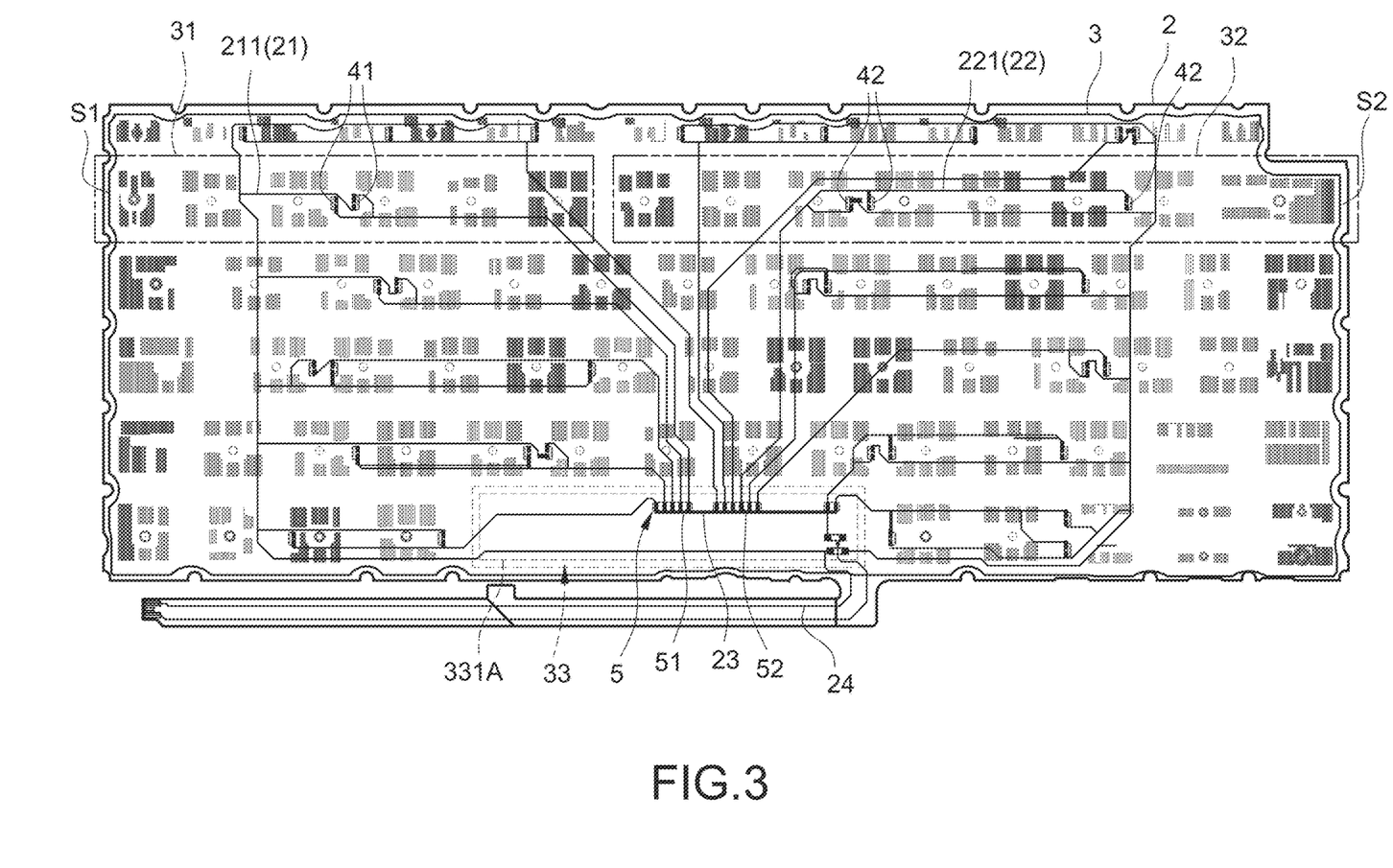
FIG. 3 is the top view diagram of the light guiding plate and the circuit board of the backlight module.

FIG. 1 is the schematic diagram of the backlight module of the illuminated keyboard in disclosure. FIG. 2 is the part schematic diagram of the backlight module along line A-A in FIG. 1. FIG. 3 is the top view diagram of the light guiding plate and the circuit board of the backlight module. As shown in FIG. 1, FIG. 2, and FIG. 3, the backlight module 1 includes, for example, a circuit board 2, a light guiding plate 3, a plurality of light emitting elements 41, 42, and a resistor unit 5. In some embodiments, the backlight module 1 may further include a light shielding sheet 6. The light shielding sheet 6 has the properties of shielding and reflecting light to control practical light emitting area.

The circuit board 2 has, for example, a surface facing the light guiding plate 3 and a surface back facing the light guiding plate 3. In some embodiments, the surface of the circuit board 2 facing the light guiding plate 3 may be coated with a reflective layer 28. The reflective layer 28 is used as a reflecting and shielding material to reflect part of the light emitted from the light emitting elements 41, 42 to the light guiding plate 3, here is not intended to be limiting. The size of the through hole on the light guiding plate 3 is greater than the size of the light emitting elements 41, 42, and the reflective layer 28 of the circuit board 2 may be directly exposed from the through holes of the light guiding plate 3. The light emitting elements 41, 42 may be disposed adjacent to or close to the reflective layer 28 to make the light be directly reflected by the reflective layer 28 to increase utilization rate of the light. The reflective layer 28 may be white, or the other color suitable for reflection. The reflective layer 28 may be integrally formed with the circuit board 2 for leveling the light input location, decreasing the loss of input light, and optimizing the light input efficiency. The circuit board 2 may be, but not limited to, a flexible printed circuit (FPC).

In the embodiment, the circuit board 2 has a plurality of circuits 21, 22, a gathering portion 23 and a conduction portion 24. One ends of the circuits 21, 22 are electrically connected to the gathering portion 23, and the other ends of the circuits 21, 22 are electrically connected to the conduction portion 24. The gathering portion 23 is electrically connected with the conduction portion 24. The conduction portion 24 is disposed adjacent to the long side of the circuit board 2, and the gathering portion 23 is disposed adjacent to the conduction portion 24. It is worth mentioning that, in the embodiment, the circuit board 2 has thirteen (13) circuits as an example for explaining. For example, in FIG. 3, five (5) circuits are disposed on the left side, and eight (8) circuits are disposed on the right side, here is not intended to be limiting. The amount and design of the circuit are coordinated with adjusting the amounts of the light emitting elements, the microstructure areas of the light guiding regions, and the total impedance of the circuit to make the current flowing through the light emitting elements in each region uniform and stable. Therefore, different amounts of circuits and different circuit designs may be applied with respect to different design manners, here is not intended to be limiting. In some embodiments, the circuit 21 has a line section 211, and the circuit 22 has a line section 221.

The light guiding plate 3 is disposed above the circuit board 2. The light guiding plate 3 includes the light guiding regions 31, 32. The light guiding region 31 is disposed above the line section 211, and the light guiding region 32 is disposed above the line section 221. It is worth mentioning that, in the embodiment, the light guiding plate is correspondingly divided into thirteen regions with respect to the circuits. For example, in FIG. 3, the uppermost row is divided into three regions, and the other rows are all divided into two regions on left and right as an example for explaining, here is not intended to be limiting. Similarly, the purpose of region-dividing is to coordinate with adjusting the amounts of the light emitting elements, the microstructure areas of the light guiding regions, and the total impedance of the circuit to make the current flowing through the light emitting elements in each region uniform and stable.

Therefore, different amounts of regions or different shapes of regions may be applied with respect to different design manners, here is not intended to be limiting.

The light emitting elements 41, 42 may be, for example, the side view light emitting diode (LED), which may emit single collimated light to directly inject most of the light into the light guiding plate 3 to obtain better optical coupling effect. In some embodiments, the light emitting elements 41 are disposed in parallel on the line section 211 of the circuit 21, and located in the light guiding region 31. The light emitting elements 42 are disposed in parallel on the line section 221 of the circuit 22, and located in the light guiding region 32. For example, two light emitting elements 41 on the circuit 21 are connected in parallel, one end of the circuit 21 is connected to the gathering portion 23, and the other end of the circuit 21 is connected to the conduction portion 24. Similarly, three light emitting elements 42 on the circuit 22 are connected in parallel, one end of the circuit 22 is connected to the gathering portion 23, and the other end of the circuit 22 is connected to the conduction portion 24.

The arrangements of the light guiding regions and the light emitting elements are specifically described below as an example, here is not intended to be limiting.

Figure 4A:
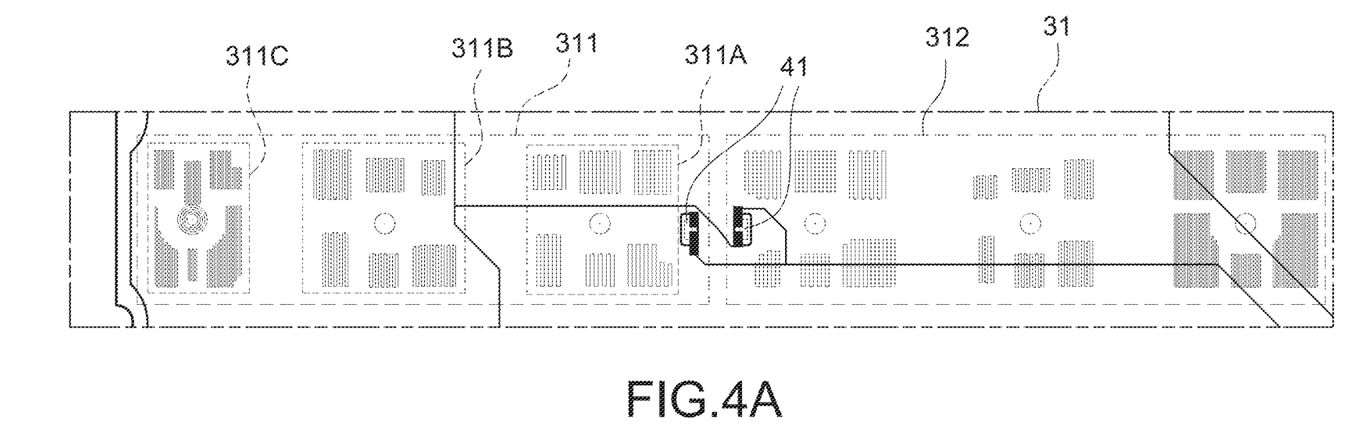
FIG. 4A is the partly enlarged schematic diagram of the light guiding region and the circuit board of the embodiment.
Figure 4B:
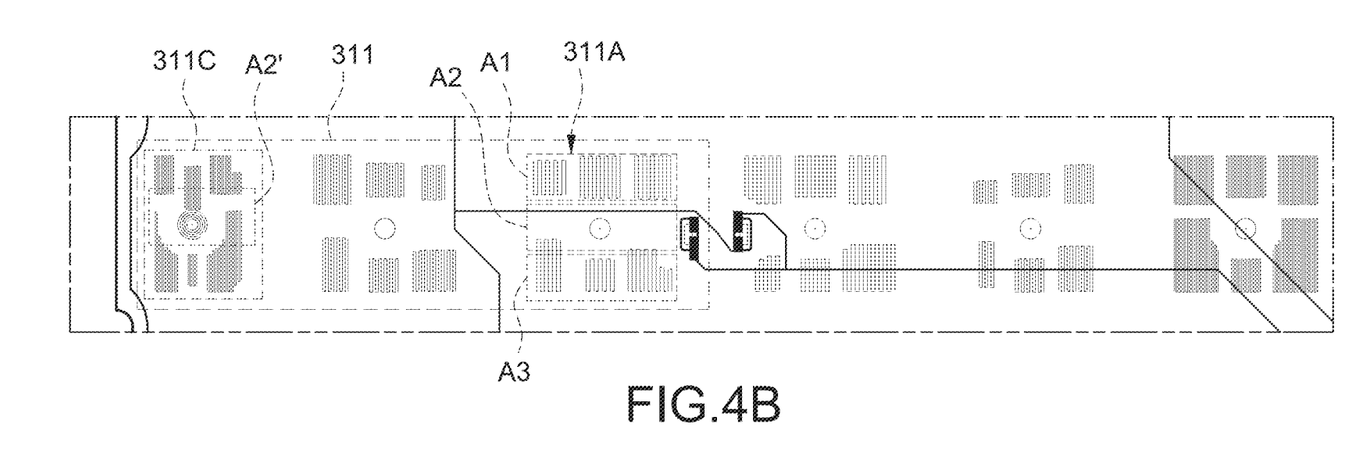
FIG. 4B is the partly enlarged schematic diagram of the light guiding region and the circuit board of the embodiment.

FIG. 4A and FIG. 4B are the partly enlarged schematic diagrams of the light guiding region and the circuit board of the embodiment. As shown in FIG. 3 and FIG. 4A, here uses the light guiding region 31 as an example. The light guiding region 31 may include a sub-region 311 and a sub-region 312 disposed adjacently to each other. Two light emitting elements 41 are disposed in parallel between the sub-region 311 and the sub-region 312. The sub-region 311 is located at one side of the light guiding region 31 (for example, the left side of FIG. 4A) and disposed adjacent to a side S1 of the light guiding plate 3 (for example, the left short side of the light guiding plate 3), and the sub-region 312 is located at the other side (for example, the right side of FIG. 4A) of the light guiding region 31. Below uses the sub-region 311 as an example, here is not intended to be limiting.

The sub-region 311 may include, for example, a single key light guiding region 311A, a single key light guiding region 311B, and a single key light guiding region 311C. The single key light guiding region 311B is disposed between the single key light guiding region 311A and the single key light guiding region 311C. The single key light guiding region 311A and the single key light guiding region 311C are disposed on two sides of the sub-region 311. The single key light guiding region 311A is disposed adjacent to the light emitting element 41, and the single key light guiding region 311C is disposed away from the light emitting element 41 and adjacent to the side S1 of the light guiding plate 3. In other words, the distance between the single key light guiding region 311A and the side S1 is greater than the distance between the single key light guiding region 311C and the side S1.

Further, one of the light emitting elements 41 disposed in parallel (such as the light emitting element 41 on the left side in FIG. 4A) is disposed on one side of the single key light guiding region 311A and emits the light toward the single key light guiding region 311A and the single key light guiding region 311C. Since the single key light guiding region 311A is close to the light emitting element 41 and the single key light guiding region 311C is away from the light emitting element 41, the light energy received by the single key light guiding region 311A is greater than the light energy received by the single key light guiding region 311C, and thus, the microstructure density of the single key light guiding region 311A is less than the microstructure density of the single key light guiding region 311C. That is, with respect to the distance to the light emitting element 41, the microstructure density of the single key light guiding region 311A is smallest, the microstructure density of the single key light guiding region 311C is greatest, and the microstructure density of the single key light guiding region 311B is in between the single key light guiding region 311A and the single key light guiding region 311C.

Similarly, as shown in FIG. 4B, in the embodiment, any one of the single key light guiding regions 311A, 311B, 311C may be divided into top region, middle region, and bottom region. Using the single key light guiding regions 311A as an example, the single key light guiding regions 311A may be divided into the regions A1, A2, A3 (top region, middle region, and bottom region in FIG. 4B). In one embodiment, the regions A1, A2, A3 may be three equal parts of the area of the single key light guiding regions 311A, but here is not limited to equal parts. The light emitting element 41 is disposed at one side of the region A2. The same as above reason, since the region A2 is close to the light emitting element 41, the microstructure density of the region A2 is less than the microstructure density of the region A1 or the region A3. On the other hand, since the single key light guiding regions 311C is farthest from the light emitting element 41, the microstructure density of the region A2' of the single key light guiding regions 311C corresponding to the light emitting element 41 is greater than the microstructure density of the region A2 of the single key light guiding regions 311A.

Further, as a whole, the arrangement of the microstructure in the sub-region 312 is similar to that in the sub-region 311, the difference is that the two are mirror symmetry with respect to the light emitting element 41 as the center, and here is omitted for brevity.

Generally speaking, the light guiding region 31 may be, for example, divided into top, middle, and bottom regions with equal area, and the light emitting element 41 is disposed correspondingly at the middle region. Therefore, the microstructure density of the middle region is less than that of the top region and/or the bottom region in the light guiding region 31. In other words, the sub-region 311 and the sub-region 312 have, for example, the light transmitting channel (the region where the microstructure density is smaller), and the light transmitting channel may pass through the single key light guiding regions 311A, the single key light guiding regions 311B, and/or the single key light guiding regions 311C.

Figure 4C:
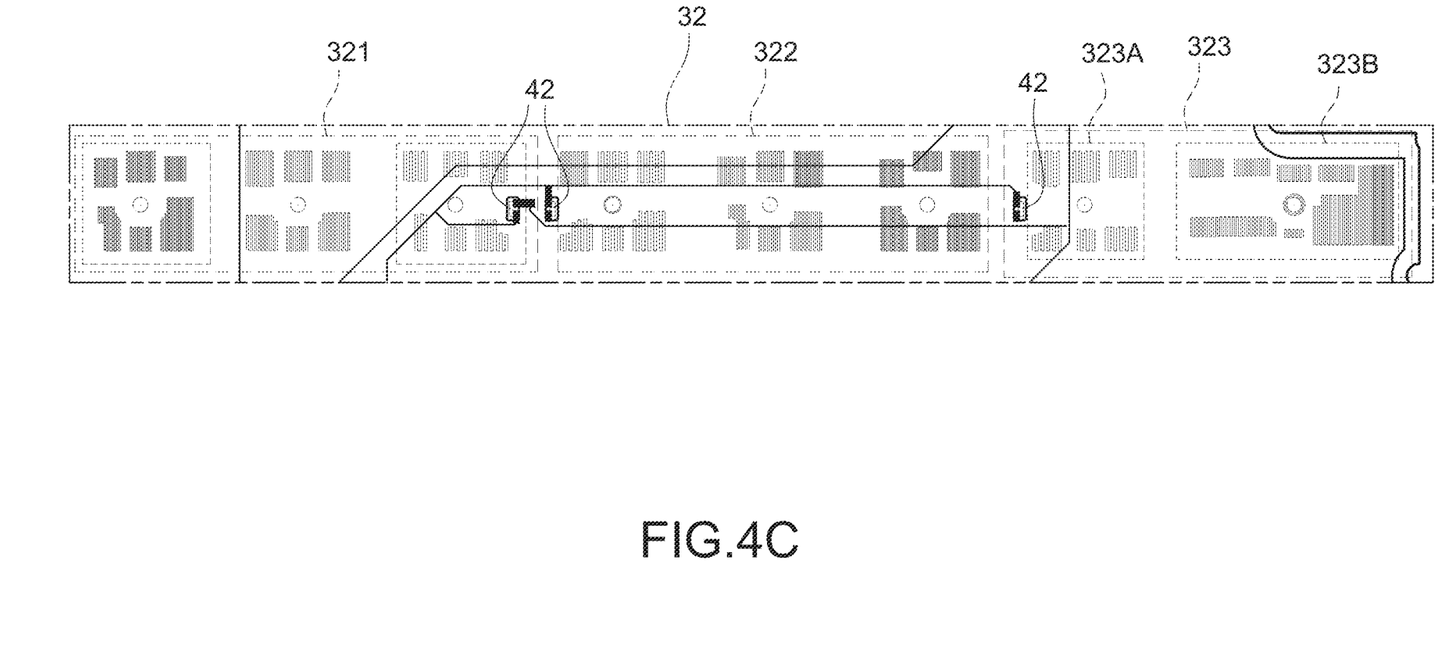
FIG. 4C is the partly enlarged schematic diagram of the light guiding region and the circuit board of the embodiment.

FIG. 4C is the partly enlarged schematic diagram of the light guiding region and the circuit board of the embodiment. As shown in FIG. 3 and FIG. 4C, here uses the light guiding region 32 located on the right side as an example. The light guiding region 32 may include a sub-region 321, a sub-region 322 and a sub-region 323. The sub-region 321 is disposed adjacent to the light guiding region 31, the sub-region 322 is disposed between the sub-region 321 and the sub-region 323, and the sub-region 323 is disposed adjacent to the other side S2 (for example, the right short side of the light guiding plate 3 in FIG. 3) of the light guiding plate 3.

The area of the light guiding region 32 is greater than the area of the light guiding region 31. Thus, the light guiding region 32 has three light emitting elements 42, and three light emitting elements 42 are disposed on the second line section 221 of the circuit 22. Two light emitting elements 42 are disposed in parallel between the sub-region 321 and the sub-region 322, and one light emitting element 42 is disposed at one side of the sub-region 323. The arrangements of the sub-region 321 and the sub-region 322 of the light guiding region 32 are the same with the arrangements of the sub-region 311 and the sub-region 312 of the light guiding region 31, here is omitted for brevity.

On the other hand, the sub-region 323, for example, may only have two single key light guiding regions. That is, the single key light guiding region 323A and the single key light guiding region 323B. The same as above reason, since the single key light guiding region 323A is close to the light emitting element 42 and the single key light guiding region 323B is away from the light emitting element 42, the microstructure density of the single key light guiding region 323A is less than the microstructure density of the single key light guiding region 323B.

Referring back to FIG. 3, the light guiding plate 3 may further include the light guiding region 33. The light guiding region 33 includes the single key light guiding region 331A. The area of the single key light guiding region 331A is greater than the area of any other single key light guiding region (for example, the single key light guiding regions 311A, 311B, 311C in FIG. 4A, or the single key light guiding regions 323A, 323B in FIG. 4C) in the other light guiding regions. The gathering portion 23 is disposed on the circuit board 2 in the region vertically corresponding to the light guiding region 33. The single key light guiding region 331A is, for example, corresponding to the keycap of space key.

Further, the resistor unit 5 of the backlight module, for example, has a resistor 51 and a resistor 52. The resistor 51 is disposed on the circuit 21, and the resistor 52 is disposed on the circuit 22. The resistor 51 and the resistor 52 are disposed in the gathering portion 23.

The arrangements of the resistors in different light guiding regions are specifically described below as an example, here is not intended to be limiting.

First, as shown in FIG. 3, using the circuits 21, 22 corresponding to the light guiding regions 31, 32 located on the same row as an example. When the amount (for example, two) of the light emitting elements 41 disposed in the light guiding region 31 is less than the amount (for example, three) of the light emitting elements 42 disposed in the light guiding region 32, the total impedance of the light emitting elements 41 on the circuit 21 is less than the total impedance of the light emitting elements 42 on the circuit 22. Further, a line length of a center position of the light emitting elements 41 on the circuit 21 to the gathering portion 23 is substantially equal to a line length of a center position of the light emitting elements 42 on the circuit 22 to the gathering portion 23, the line impedance of the circuit 21 is substantially equal to the line impedance of the circuit 22. Therefore, the impedance of the resistor 51 connected to the circuit 21 is disposed to be greater than the impedance of the resistor 52 connected to the circuit 22. As a result, a sum of the impedance of the light emitting elements 41 on the circuit 21, the line impedance of the circuit 21 and the impedance of the resistor 51 is substantially about equal to a sum of the impedance of the light emitting elements 42 on the circuit 22, the line impedance of the circuit 22 and the impedance of the resistor 52. In other words, the total impedance of the circuit 21 is substantially equal to the total impedance of the circuit 22.

It should be noted that, in the embodiment, the center position of the light emitting elements indicates the center position between the light emitting elements located at outermost sides on the circuit. For example, the central position of the distance between the two light emitting elements 41 in the light guiding region 31, or the central position of the distance between the two light emitting elements 42 located at the outermost sides in the light guiding region 32. Further, the line length indicates the line length from the center position of the light emitting elements to the gathering portion. For example, the line length from the center position of the two light emitting elements 41 in the light guiding region 31 to the gathering portion, and the line length from the center position of the two light emitting elements 42 located at the outermost sides in the light guiding region 32 to the gathering portion. Hereafter, the center position and the line length are used with the aforementioned definition.

As a result, the backlight module 1 of the embodiment may improve the illuminance of different light guiding regions 31, 32 and make the optical coupling more uniform, and further lower the brightness difference between different light guiding regions 31, 32 to a level which human eyes cannot distinguish (for example, the brightness difference is within 50%).

Figure 5:
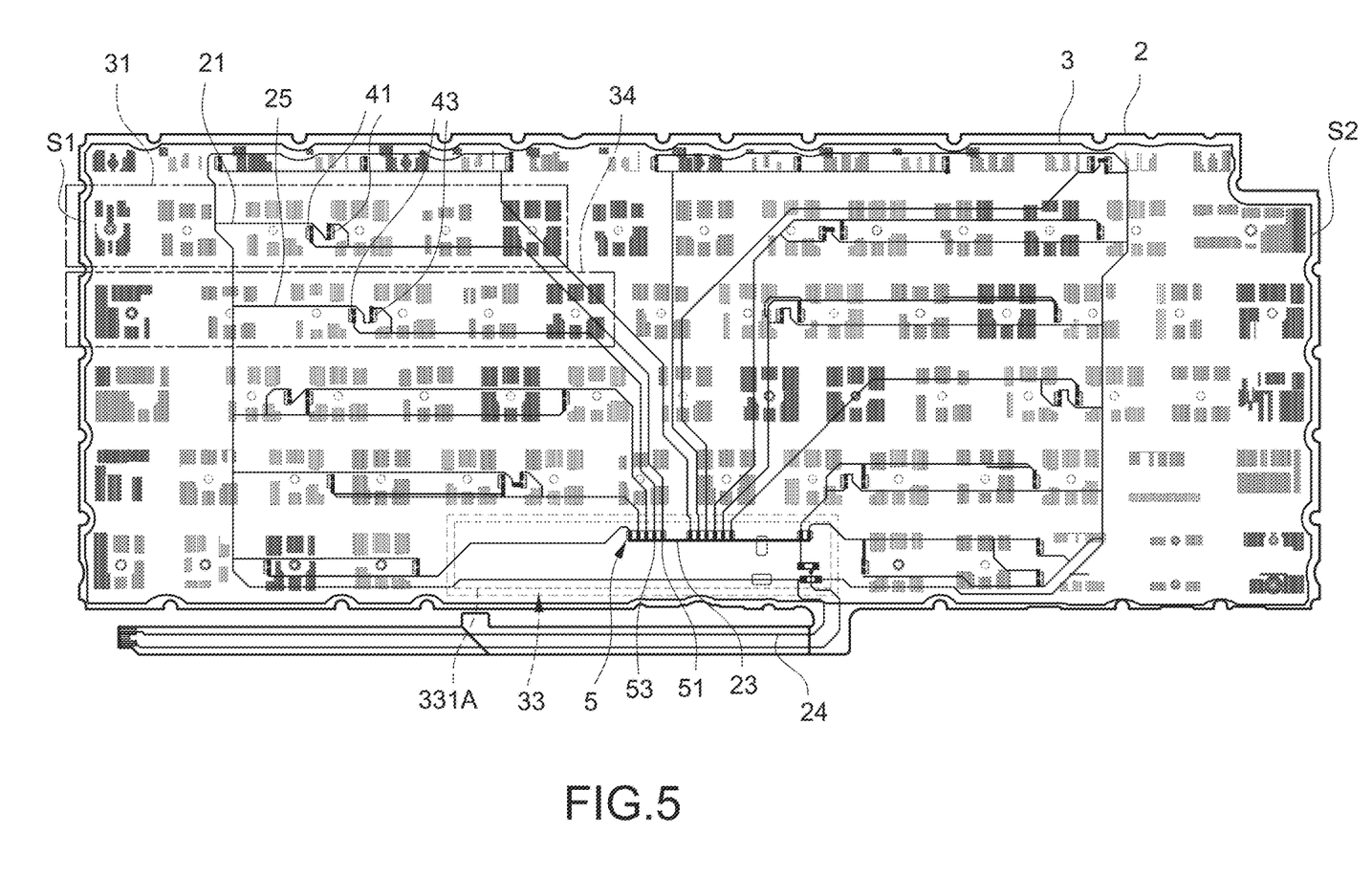
FIG. 5 is the top view diagram of the light guiding plate and the circuit board of the backlight module.

FIG. 5 is the top view diagram of the light guiding plate and the circuit board of the backlight module. As shown in FIG. 5, using the circuits 21, 25 corresponding to the light guiding regions 31, 34 located on different rows as an example. When the amount (for example, two) of the light emitting elements 41 disposed in the light guiding region 31 is equal to the amount (for example, two) of the light emitting elements 43 disposed in the light guiding region 34, the total impedance of the light emitting elements 41 on the circuit 21 is equal to the total impedance of the light emitting elements 43 on the circuit 25. Further, the line length of the center position of the light emitting elements 41 on the circuit 21 to the gathering portion 23 is greater than a line length of a center position of the light emitting elements 43 on the circuit 25 to the gathering portion 23, the line impedance of the circuit 21 is about greater than the line impedance of the circuit 25. Therefore, the impedance of the resistor 51 connected to the circuit 21 is disposed to be less than the impedance of the resistor 53 connected to the circuit 25. As a result, the sum of the impedance of the light emitting elements 41 on the circuit 21, the line impedance of the circuit 21 and the impedance of the resistor 51 is substantially about equal to a sum of the impedance of the light emitting elements 43 on the circuit 25, the line impedance of the circuit 25 and the impedance of the resistor 53.

As a result, the backlight module 1 of the embodiment may improve the illuminance of different light guiding regions 31, 34 and make the optical coupling more uniform, and further lower the brightness difference between different light guiding regions 31, 34 to a level which human eyes cannot distinguish (for example, the brightness difference is within 50%).

Figure 6:
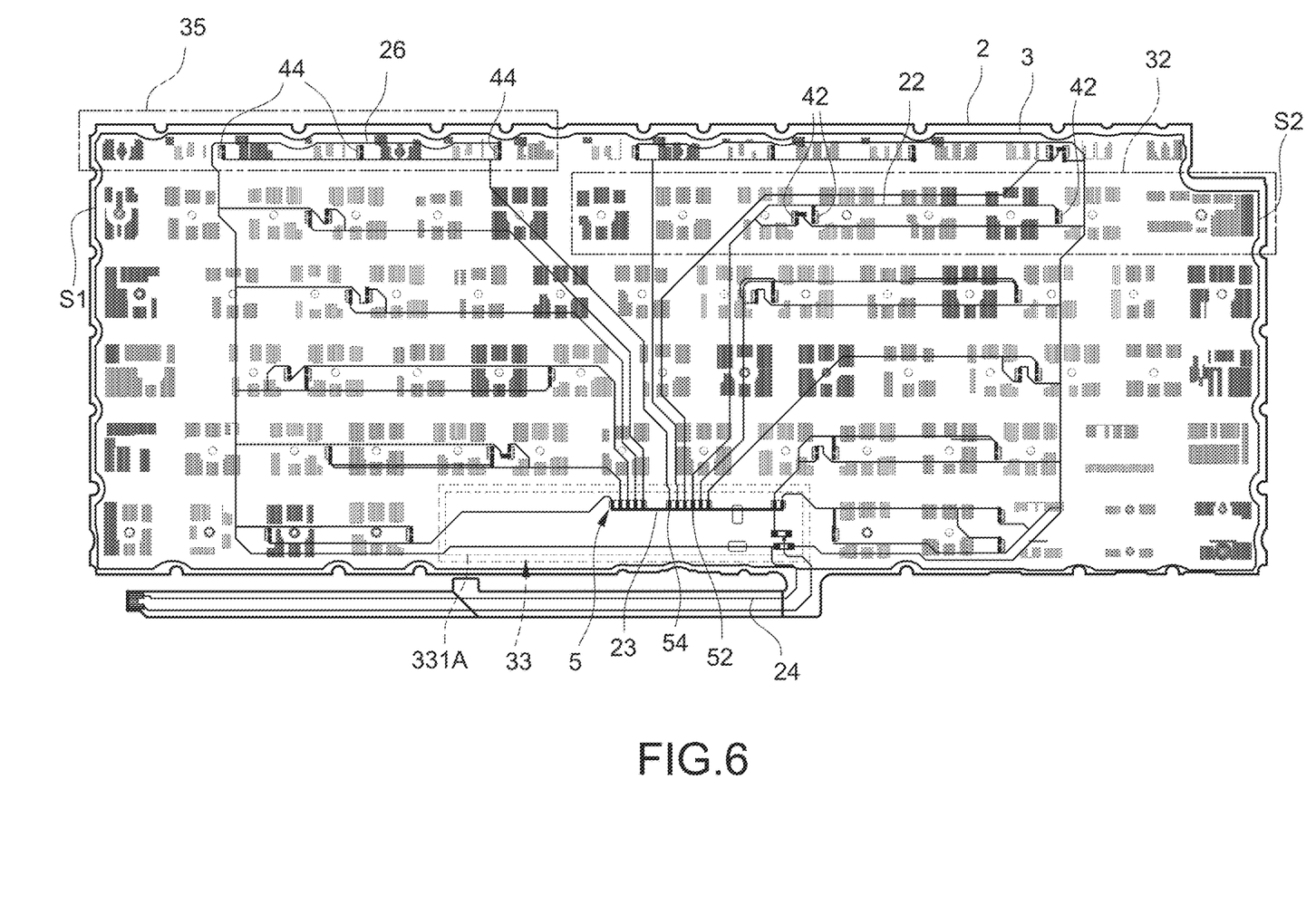
FIG. 6 is the top view diagram of the light guiding plate and the circuit board of the backlight module.

FIG. 6 is the top view diagram of the light guiding plate and the circuit board of the backlight module. As shown in FIG. 6, using the circuits 22, 26 corresponding to the light guiding regions 32, 35 located on different rows as an example. When the amount (for example, three) of the light emitting elements 42 disposed in the light guiding region 32 is equal to the amount (for example, three) of the light emitting elements 44 disposed in the light guiding region 35, the total impedance of the light emitting elements 42 on the circuit 22 is equal to the total impedance of the light emitting elements 44 on the circuit 26. Further, a microstructure area sum of the single key light guiding regions of the light guiding region 32 is substantially greater than a microstructure area sum of the single key light guiding regions in the light guiding region 35. Therefore, the impedance of the resistor 52 connected to the circuit 22 is disposed to be greater than the impedance of the resistor 54 connected to the circuit 26 to further increase the brightness of the light guiding region 35. Moreover, the line length of the center position of the light emitting elements 42 on the circuit 22 to the gathering portion 23 is less than a line length of a center position of the light emitting elements 44 on the circuit 26 to the gathering portion 23, the line impedance of the circuit 22 is about less than the line impedance of the circuit 26. Therefore, the sum of the line impedance of the circuit 22 and the impedance of the resistor 52 is substantially about equal to the sum of the line impedance of the circuit 26 and the impedance of the resistor 54. That is, the sum of the impedance of the light emitting elements 42 on the circuit 22, the line impedance of the circuit 22 and the impedance of the resistor 52 is substantially about equal to a sum of the impedance of the light emitting elements 44 on the circuit 26, the line impedance of the circuit 26 and the impedance of the resistor 54.

As a result, the backlight module 1 of the embodiment may improve the illuminance of different light guiding regions 32, 35 and make the optical coupling more uniform, and further lower the brightness difference between different light guiding regions 32, 35 to a level which human eyes cannot distinguish (for example, the brightness difference is within 50%).

Figure 7:
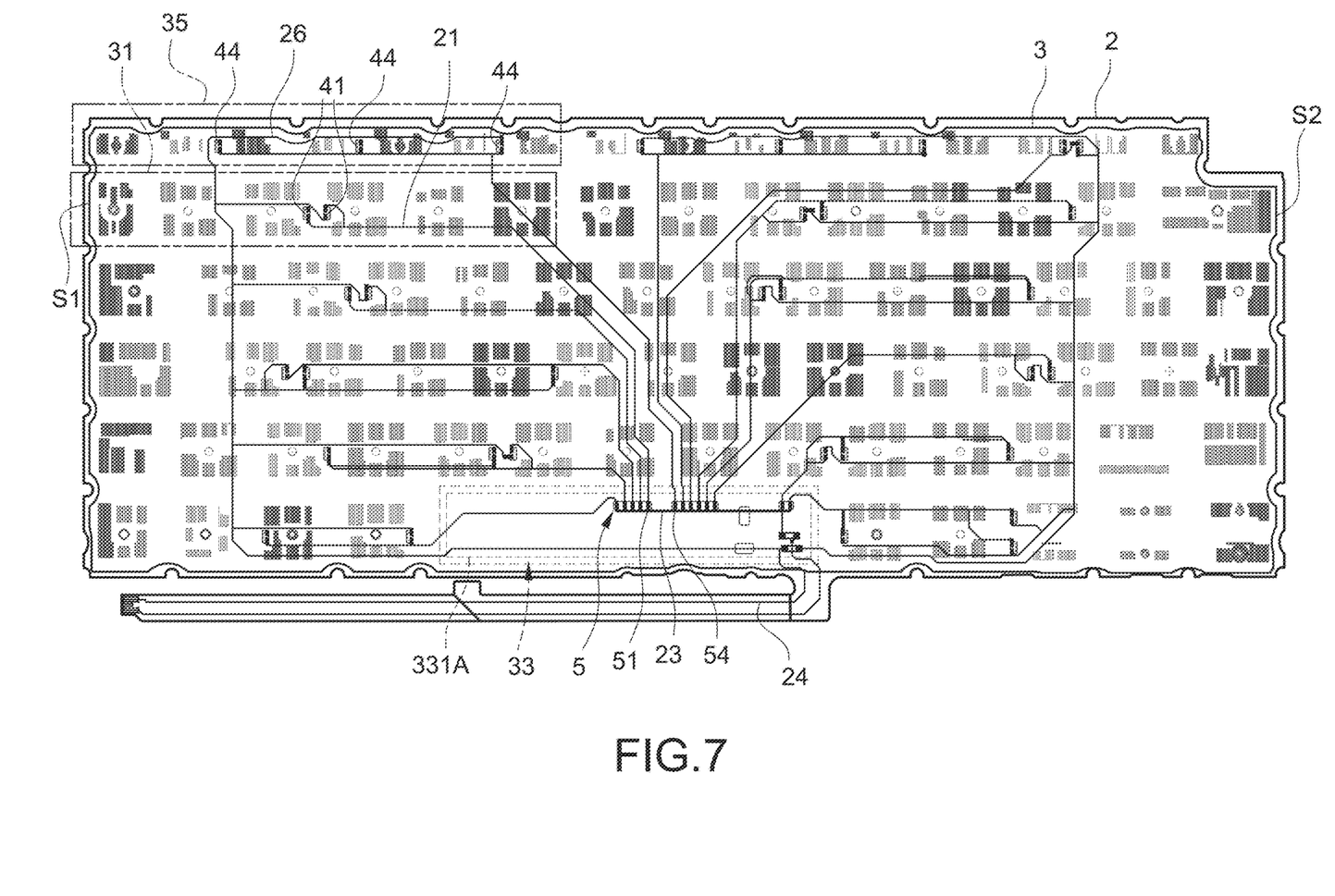
FIG. 7 is the top view diagram of the light guiding plate and the circuit board of the backlight module.

FIG. 7 is the top view diagram of the light guiding plate and the circuit board of the backlight module. As shown in FIG. 7, using the circuits 21, 26 corresponding to the light guiding regions 31, 35 located on different rows as an example. A microstructure area sum of the single key light guiding regions of the light guiding region 31 is substantially greater than the microstructure area sum of the single key light guiding regions in the light guiding region 35. Therefore, the amount (for example, two) of the light emitting elements 41 disposed in the light guiding region 31 is less than the amount (for example, three) of the light emitting elements 44 disposed in the light guiding region 35. In other words, a ratio of the microstructure area sum of the single key light guiding regions of the light guiding region 31 divided by the amount of the light emitting elements 41 on the line section in the light guiding region 31 is greater than a ratio of the microstructure area sum of the single key light guiding regions of the light guiding region 35 divided by the amount of the light emitting elements 44 on the line section in the light guiding region 35. Therefore, the impedance of the resistor 51 on the circuit 21 may be disposed to be greater than the impedance of the resistor 54 on the circuit 26 to further increase the brightness of the light guiding region 35.

As a result, the backlight module 1 of the embodiment may improve the illuminance of different light guiding regions 31, 35 and make the optical coupling more uniform, and further lower the brightness difference between different light guiding regions 31, 35 to a level which human eyes cannot distinguish (for example, the brightness difference is within 50%).

In summary, the backlight module of the illuminated keyboard in the embodiment is dividing the keyboard into a plurality of regions corresponding to the arrangement of the keycaps and dividing the light guiding plate into a plurality of light guiding regions corresponding to the regions, and a plurality of circuits are similarly disposed on the circuit board corresponding to the regions. Different regions have different light emitting areas and different line lengths. The backlight module of the embodiment may have the light emitting elements in different amounts and the light guiding regions with different microstructure areas corresponding to different light emitting areas. Further, the backlight module of the embodiment may have the resistors with different impedances corresponding to different line lengths for making the current of each circuit uniform and stable. In other words, the backlight module of the embodiment may improve the illuminance of the backlight module and make the optical coupling more uniform through adjusting the amounts of the light emitting elements, the microstructure areas of the light guiding regions, and the total impedance of the circuit corresponding to different regions, and further lower the brightness difference between different light guiding regions to a level which human eyes cannot distinguish (for example, the brightness difference is within 50%).

Figure 8:
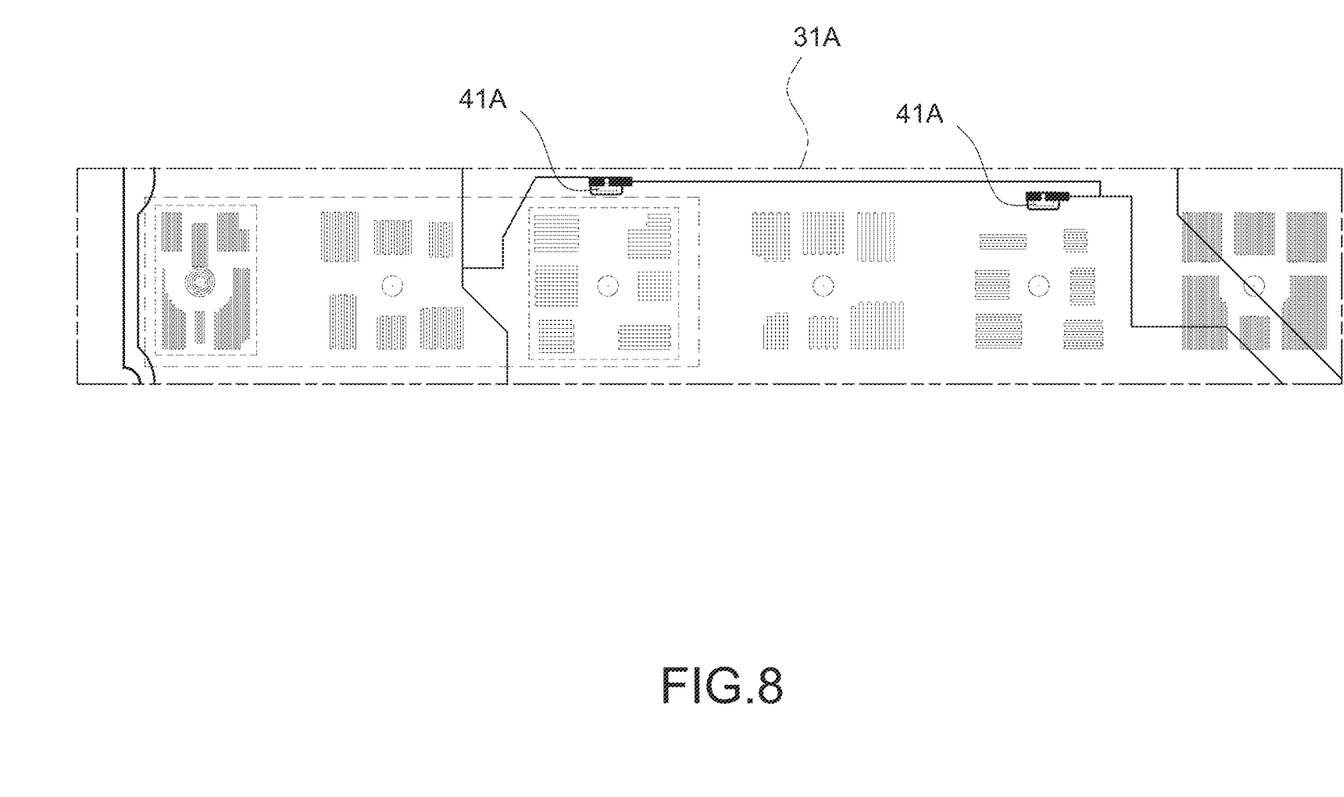
FIG. 8 is the top view diagram of the light guiding plate and the circuit board of the backlight module in the variant embodiment.

FIG. 8 is the top view diagram of the light guiding plate and the circuit board of the backlight module in the variant embodiment. As shown in FIG. 8, the light emitting elements 41A may be disposed at one side (for example, upper side) of the light guiding region 31A. For example, the light emitting elements 41A may be disposed at a side of the light guiding region 31A adjacent to the long side of the light guiding plate. Of course, the microstructure of the single key light guiding region in the light guiding region 31A may be modified accordingly. As a result, the designs for the light emitting element and the light guiding region may be increased. It should be noted that the light emitting element may be disposed at bottom side of the light guiding region or the other different locations depending on different design requirement.

In summary, the backlight module of the illuminated keyboard in the disclosure is dividing the keyboard into a plurality of regions corresponding to the arrangement of the keycaps and dividing the light guiding plate into a plurality of light guiding regions corresponding to the regions, and a plurality of circuits are similarly disposed on the circuit board corresponding to the regions. Different regions have different light emitting areas and different line lengths. The backlight module of the disclosure may have the light emitting elements in different amounts and the light guiding regions with different microstructure areas corresponding to different light emitting areas. Further, the backlight module of the disclosure may have the resistors with different impedances corresponding to different line lengths for making the current of each circuit uniform and stable. In other words, the backlight module of the disclosure may improve the illuminance of the backlight module and make the optical coupling more uniform through adjusting the amounts of the light emitting elements, the microstructure areas of the light guiding regions, and the total impedance of the circuit corresponding to different regions, and further lower the brightness difference between different light guiding regions to a level which human eyes cannot distinguish (for example, the brightness difference is within 50%).

While this disclosure has been described by means of specific embodiments, numerous modifications and variations may be made thereto by those skilled in the art without departing from the scope and spirit of this disclosure set forth in the claims.

What is claimed is:

1. A backlight module of an illuminated keyboard, the backlight module comprising:
   a circuit board, comprising a first circuit, a second circuit, a gathering portion and a conduction portion, the first circuit and the second circuit electrically connected to the gathering portion, the gathering portion electrically connected to the conduction portion, the first circuit comprising a first line section, and the second circuit comprising a second line section;

a light guiding plate, disposed on the circuit board, comprising a first light guiding region and a second light guiding region, the first light guiding region disposed on the first line section, and the second light guiding region disposed on the second line section;

a plurality of light emitting elements, disposed in parallel on the first line section and disposed in parallel on the second line section; and a resistor unit, comprising a first resistor and a second resistor, the first resistor disposed on the first circuit, and the second resistor disposed on the second circuit, wherein a sum of a line impedance of the first circuit and an impedance of the first resistor is substantially equal to a sum of a line impedance of the second circuit and an impedance of the second resistor.

2. The backlight module according to claim 1, wherein the first light guiding region comprises a first sub-region and a second sub-region disposed adjacently, the first sub-region comprises a first single key light guiding region and a second single key light guiding region disposed on two sides thereof, and one of the light emitting elements is disposed on one side of the first single key light guiding region and emits a light toward the first single key light guiding region and the second single key light guiding region.

3. The backlight module according to claim 2, wherein the first sub-region comprises a light transmitting channel passing through the first single key light guiding region and the second single key light guiding region.

4. The backlight module according to claim 3, wherein the first sub-region is disposed adjacent to a side of the light guiding plate, a distance between the first single key light guiding region and the side is greater than a distance between the second single key light guiding region and the side, and a microstructure density of the first single key light guiding region is less than a microstructure density of the second single key light guiding region.

5. The backlight module according to claim 2, wherein the light guiding plate comprises a third light guiding region, the third light guiding region comprises a third single key light guiding region, an area of the third single key light guiding region is greater than an area of the first single key light guiding region or an area of the second single key light guiding region, and the gathering portion is disposed on the circuit board in a region vertically corresponding to the third light guiding region.

6. The backlight module according to claim 1, wherein an amount of the light emitting elements on the first line section is equal to an amount of the light emitting elements on the second line section, a line length of a center position of the light emitting elements on the first circuit to the gathering portion is greater than a line length of a center position of the light emitting elements on the second circuit to the gathering portion, and the impedance of the first resistor is less than the impedance of the second resistor.

7. The backlight module according to claim 1, wherein the first light guiding region comprises a plurality of single key light guiding regions, the second light guiding region comprises a plurality of single key light guiding regions, a first ratio of a microstructure area sum of the single key light guiding regions of the first light guiding region divided by an amount of the light emitting elements on the first line section is greater than a second ratio of a microstructure area sum of the single key light guiding regions of the second light guiding region divided by an amount of the light emitting elements on the second line section, and the impedance of the first resistor is greater than the impedance of the second resistor.

8. The backlight module according to claim 1, wherein an amount of the light emitting elements on the first line section is less than an amount of the light emitting elements on the second line section, a line length of a center position of the light emitting elements on the first circuit to the gathering portion is about equal to a line length of a center position of the light emitting elements on the second circuit to the gathering portion, and the impedance of the first resistor is greater than the impedance of the second resistor.

9. The backlight module according to claim 1, wherein an amount of the light emitting elements on the first line section is equal to an amount of the light emitting elements on the second line section, the first light guiding region comprises a plurality of single key light guiding regions, the second light guiding region comprises a plurality of single key light guiding regions, a microstructure area sum of the single key light guiding regions in the first light guiding region is greater than a microstructure area sum of the single key light guiding regions in the second light guiding region, and the impedance of the first resistor is greater than the impedance of the second resistor.

10. The backlight module according to claim 1, wherein the first resistor and the second resistor are electrically connected with the gathering portion.

11. The backlight module according to claim 1, wherein the conduction portion is disposed adjacent to a long side of the circuit board, and the gathering portion is disposed adjacent to the conduction portion.

12. A backlight module of an illuminated keyboard, the backlight module comprising:

a circuit board, comprising a first circuit, a second circuit, a gathering portion and a conduction portion, the first circuit and the second circuit electrically connected to the gathering portion, and the gathering portion electrically connected to the conduction portion;

a light guiding plate, disposed on the circuit board, comprising a first light guiding region and a second light guiding region;

a plurality of first light emitting elements, disposed in parallel on the first circuit, and located in the first light guiding region; and a plurality of second light emitting elements, disposed in parallel on the second circuit, and located in the second light guiding region, wherein a total impedance of the first circuit is substantially equal to a total impedance of the second circuit.

13. The backlight module according to claim 12, whereon the first circuit comprises a first line section located under the first light guiding region, the second circuit comprises a second line section located under the second light guiding region, the first light emitting elements are disposed in parallel on the first line section, and the second light emitting elements are disposed in parallel on the second line section.

14. The backlight module according to claim 13, further comprising:

a resistor unit, comprising a first resistor and a second resistor, the first resistor disposed on the first circuit, and the second resistor disposed on the second circuit, wherein a sum of a line impedance of the first circuit and an impedance of the first resistor is substantially equal to a sum of a line impedance of the second circuit and an impedance of the second resistor.

15. The backlight module according to claim 14, wherein an amount of the first light emitting elements on the first line section is equal to an amount of the second light emitting elements on the second line section, a line length of a center position of the first light emitting elements on the first circuit to the gathering portion is greater than a line length of a center position of the second light emitting elements on the second circuit to the gathering portion, and the impedance of the first resistor is less than the impedance of the second resistor.

16. The backlight module according to claim 14, wherein an amount of the first light emitting elements on the first line section is equal to an amount of the second light emitting elements on the second line section, the first light guiding region comprises a plurality of single key light guiding regions, the second light guiding region comprises a plurality of single key light guiding regions, a microstructure area sum of the single key light guiding regions in the first light guiding region is greater than a microstructure area sum of the single key light guiding regions in the second light guiding region, and the impedance of the first resistor is greater than the impedance of the second resistor.

17. The backlight module according to claim 13, wherein an amount of the first light emitting elements on the first line section is less than an amount of the second light emitting elements on the second line section, a line length of a center position of the first light emitting elements on the first circuit to the gathering portion is about equal to a line length of a center position of the second light emitting elements on the second circuit to the gathering portion, and the impedance of the first resistor is greater than the impedance of the second resistor.

18. The backlight module according to claim 12, wherein the first light guiding region comprises a first sub-region and a second sub-region disposed adjacently, the first sub-region comprises a first single key light guiding region and a second single key light guiding region disposed on two sides thereof, and one of the first light emitting elements is disposed on one side of the first single key light guiding region and emits a light toward the first single key light guiding region and the second single key light guiding region.

19. The backlight module according to claim 18, wherein the light guiding plate comprises a third light guiding region, the third light guiding region comprises a third single key light guiding region, an area of the third single key light guiding region is greater than an area of the first single key light guiding region or an area of the second single key light guiding region, and the gathering portion is disposed on the circuit board in a region vertically corresponding to the third light guiding region.

20. The backlight module according to claim 12, wherein the conduction portion is disposed adjacent to a long side of the circuit board, and the gathering portion is disposed adjacent to the conduction portion.

* * * * *